US005694292A

United States Patent [19]
Paulsel et al.

[11] Patent Number: 5,694,292
[45] Date of Patent: Dec. 2, 1997

[54] PORTABLE COMPUTER DOCKING STATION WITH REMOVABLE SUPPORT SHELF APPARATUS

[75] Inventors: Jason Q. Paulsel, Conroe; Kelly K. Smith, Spring; Mark H. Ruch, The Woodlands, all of Tex.

[73] Assignee: Compaq Computer Corporation, Houston, Tex.

[21] Appl. No.: 693,872

[22] Filed: Aug. 5, 1996

[51] Int. Cl.$^6$ .................. G06F 1/16; G06F 1/20; H05K 7/10; H05K 7/20
[52] U.S. Cl. .................. 361/686; 361/687; 108/108
[58] Field of Search .................. 108/108; 211/153, 211/90, 184; 361/683, 686, 687; 364/708.1

[56] References Cited

U.S. PATENT DOCUMENTS

| 3,355,134 | 11/1967 | Chesley | 108/108 X |
|---|---|---|---|
| 4,203,373 | 5/1980 | Conti | 108/108 X |
| 4,454,948 | 6/1984 | Spamer | 108/108 X |
| 5,182,698 | 1/1993 | Kobayashi et al. | 361/686 |
| 5,323,291 | 6/1994 | Boyle et al. | 361/686 |
| 5,436,792 | 7/1995 | Leman et al. | 361/686 |
| 5,450,968 | 9/1995 | Bustos | 108/108 X |
| 5,526,944 | 6/1996 | Merl | 108/108 X |
| 5,535,093 | 7/1996 | Noguchi et al. | 361/686 |
| 5,592,886 | 1/1997 | Williams et al. | 108/108 |

Primary Examiner—Michael W. Phillips
Attorney, Agent, or Firm—Konneker & Smith, P.C.

[57] ABSTRACT

A docking station has a removable guide and support shelf along which a portable computer may be slid into operatively coupled engagement with the docking station. By using a vertical side portion of the shelf as a horizontal computer guide, and appropriately positioning the computer docking connector relative to the corresponding guided computer surface, the shelf enables the same docking station to be used with portable computers having different geometric configurations. Alternatively, a differently configured portable computer may be operatively coupled to the docking station by replacing the shelf with a differently configured guide and support shelf. The removable shelf is provided with a mounting latch structure for removably retaining it on the docking station, and a security latch structure that automatically engages the computer during its docking movement. When docked, the computer rests atop three mutually spaced vertical projections formed on the top side of the base wall portion of the shelf. This forms a cooling air passageway between the bottom of the computer and the top side of the shelf. A fan in the docking station draws ambient air through this passageway and then flows the air downwardly through cooling slots in the shelf before exhausting the air back to ambient. The fan also draws ambient cooling air downwardly through a gap between the rear side of the docked computer and a facing connection area of the docking station.

37 Claims, 5 Drawing Sheets

# PORTABLE COMPUTER DOCKING STATION WITH REMOVABLE SUPPORT SHELF APPARATUS

BACKGROUND OF THE INVENTION

1. Field of the Invention

The present invention generally relates to computer apparatus and, in a preferred embodiment thereof, more particularly relates to a portable computer docking station having removable support shelf apparatus that conveniently permits the docking station to be used with portable computers of different configurations.

2. Description of Related Art

In computer parlance a "docking station" is an interface device to which a portable computer, such as the increasingly popular notebook computer, may be operatively and removably coupled to connect its central processing unit and other internal circuitry to desktop computer peripheral devices such as a keyboard, monitor, printer and mouse. In this manner the portable computer may be used "on the road" by its owner, utilizing its own keyboard, monitor and mouse, and later used in a home or office desktop work station in conjunction with the larger desktop peripheral devices. Thus, a single computer can provide its user with both the compactness, light weight, portability and diminutive work space requirements of the notebook computer and the power and comfort of a desktop system with its larger work space and peripheral devices.

A conventionally configured docking station typically comprises a housing adapted to sit atop the desktop work space and containing the interface electronics used to connect the "docked" portable computer to the desktop peripheral devices operatively coupled to the docking station. The housing has a horizontal guide and support surface upon which the portable computer is rested, keyboard side up, before being horizontally moved rearwardly to removably couple a connector on the rear side of the computer to a corresponding docking connector on the docking station housing.

While the typical docking station of conventional construction is generally well suited for its intended portable computer-to-desktop peripheral device linking function, it has a notable limitation—namely, it is compatible, from a mechanical docking connection standpoint, only with the single portable computer for which it was designed. If an attempt is made to dock another portable computer having a different housing geometry and/or computer connector location, the differently configured computer typically cannot be operatively connected to the docking station.

It can thus be seen that it would be desirable to provide improved docking station apparatus that could be utilized with portable computers having different configurations. It is accordingly an object of the present invention to provide such improved docking station apparatus.

SUMMARY OF THE INVENTION

In carrying out principles of the present invention, in accordance with a preferred embodiment thereof, computer apparatus is provided that includes a docking station incorporating a specially designed removable shelf structure that permits the docking station to accommodate portable computers of varying form factors.

The docking station has a connection section carrying a connector removably mateable with a corresponding connector on a portable computer, and a base section. The shelf structure includes (1) a body portion having a top side surface, (2) a guide and support portion positioned on the top side of the body portion and being slidably engageable by the portable computer in a manner guiding its connector into an operatively mated relationship with the docking station connector, and (3) an attachment portion associated with the body portion and being cooperative with a portion of the docking station to removably secure the shelf member thereto to thereby permit the shelf member to removed and replaced with a second shelf member having a differently configured guide and support portion configured for operative association with a second portable computer having a form factor different from that of the first-mentioned portable computer.

The shelf member is preferably of a molded plastic construction with front and rear side edge portions and an end edge portion. In a preferred embodiment thereof, the guide and support portion of the shelf member representatively includes (1) first, second and third spaced apart, noncollinear vertical support projections having upper side surfaces upwardly offset from the top side surface of the shelf member body portion and lying generally in a plane, such upper side surfaces being adapted to underlie and slidingly support an underside portion of the portable computer; and (2) a guide projection positioned on the end edge portion and having a vertically oriented surface adapted to be slidingly engaged by a corresponding vertical surface of the portable computer.

In a preferred embodiment thereof, the shelf member attachment portion representatively includes (1) a depending lip portion formed on the front side edge of the shelf member and configured to complementarily receive a corresponding wall edge portion of the docking station; (2) rearwardly projecting rear corner tabs formed on the shelf member body portion and configured to be complementarily received in corresponding slots in the docking station connection section; (3) upper and lower rearwardly projecting rear side edge tabs configured to complementarily receive therebetween a corresponding forwardly projecting tab on the docking station connection portion; and (4) an attachment latch member carried on the underside of the shelf member body portion and positioned to releasably engage a facing portion of the docking station.

Representatively, the first and second shelf member support projections are positioned along the front side edge of the shelf member and have reduced height rearwardly extending extension portions, and the third shelf member support projection is centrally positioned along the rear side edge of the shelf member.

The overall computer apparatus may also include a portable computer that is releasably connectable to the docking station, the portable computer having front side, a rear side on which is disposed a connector that is releasably interengageable with the docking station connector, a bottom side from which a spaced series of support feet depend, and a third side extending between its front and rear sides.

To dock the computer, a rear underside portion thereof is placed atop the first and second support projections of the installed tray member, with the third side of the computer horizontally positioned against the tray member guide projection. The computer is then slid rearwardly along the guide and support portion of the tray member, which maintains horizontal and vertical alignment between the computer and docking station connectors, until the facing computer and docking station connectors are operatively mated. As this occurs, a pair of guide pins on the docking station enter corresponding rear side sockets on the computer and provide final connector alignment, and a pair of latch hook members enter and releasably lock into corresponding rear side openings in the computer.

During an initial rearward movement of the computer toward the connection section of the docking station a rear underside portion of the computer may tend to dip down toward the top side surface of the shelf member before the rear underside portion of the computer rides up onto the rearwardly disposed third shelf member support projections. The reduced height rearward extensions of the first and second vertical support projections slidingly engage the underside of the computer during such rearward movement in a manner preventing the computer support feet from dragging along the top side of the support tray and frictionally impeding the computer's rearward docking movement.

According to another feature of the invention, the tray member vertical support projections elevate the docked computer above the top side of the tray member body portion in a manner creating a passage positioned between the bottom computer side and the top shelf side. To dissipate docked computer operating heat, a fan disposed within the docking station is operative to flow ambient cooling air sequentially through such passage, downwardly into the docking station interior through exterior top side openings therein, through the fan, and then outwardly from the docking station back to ambient.

According to another aspect of the invention, a security latch structure is mounted on the tray member body portion and releasably locks onto the docked computer, in response to its rearward docking movement, in a manner preventing the docked computer from being pivoted upwardly in a manner breaking the docking station latch hook members received therein (and thereby permitting unauthorized removal of the docked computer), yet permitting the computer to be forwardly removed from the docking station when the latch hook members are properly unlatched from the docked computer.

Portable computers of different housing sizes may be used with the same removable docking station shelf structure of the present invention by simply maintaining the same horizontal and vertical computer connector distances respectively from the third computer side and the bottom computer side, and sliding the third computer side along the aforementioned tray guide member during docking of the computer.

According to another feature of the invention, computers having different vertical connector placements thereon may be used with the same shelf structure by slightly modifying the undersides of the computers as necessary to accommodate different vertical connector placements thereon. For example, a small recess is formed in the underside of the computer, and positioned to complementarily receive a top side portion of the third vertical support projection when the computer is docked, to thereby compensate for a "high" computer connector placement. Alternatively, a small projection is formed on the underside of the computer, and positioned to rest atop the third vertical support projection when the computer is docked, to thereby compensate for a "low" computer connector placement.

According to yet another aspect of the invention, the overall computer apparatus further comprises a second removable shelf structure installable in place of the first shelf structure, with the guide and support portion of the second shelf structure having a different configuration than that of the first shelf structure to directly accommodate the different form factor of the second portable computer.

DETAILED DESCRIPTION

Figure 1:
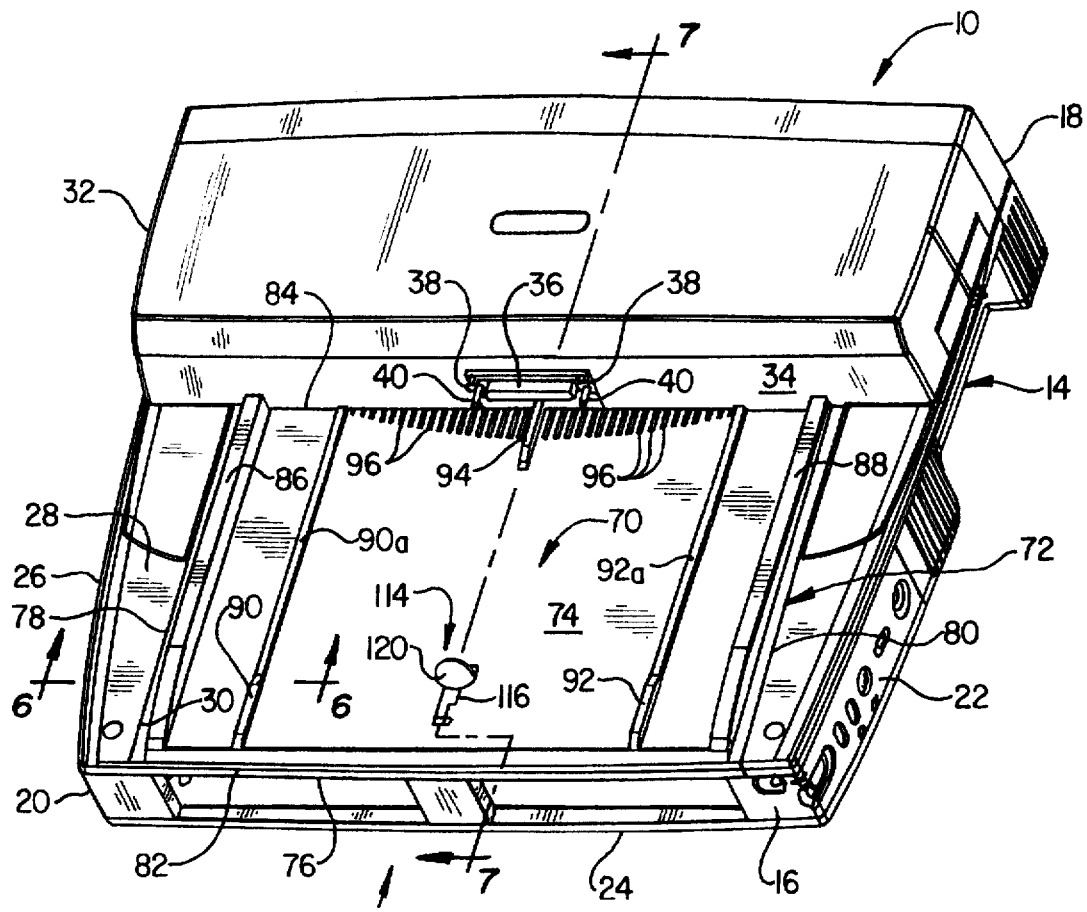
FIG. 1 is a partially phantomed perspective view of a portable computer docking station embodying principles of the present invention, and a portable notebook computer operatively and removably connectable thereto.
Figure 1:
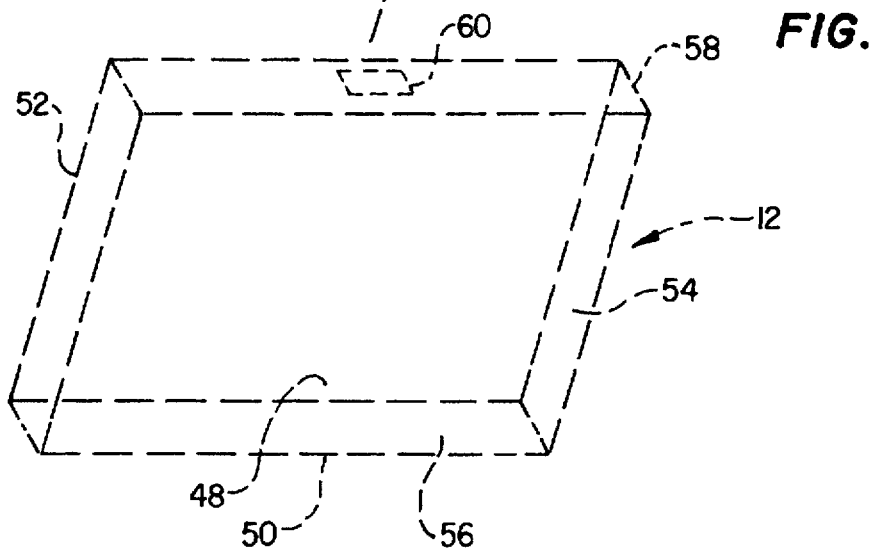
Figure 2:
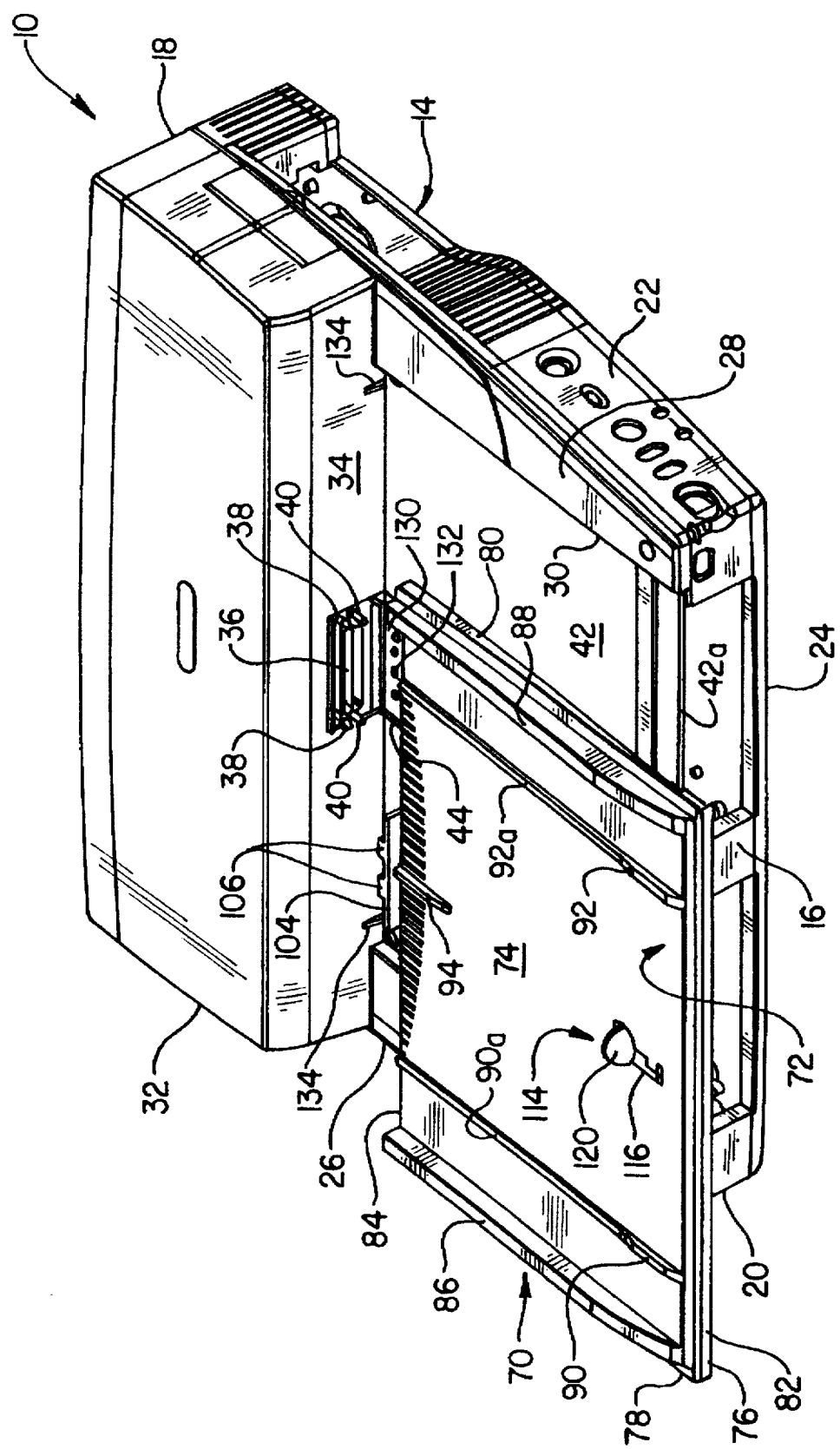
FIG. 2 is a partially exploded perspective view of the docking station with a specially designed computer support and guide shelf removed therefrom.

Perspectively illustrated in FIGS. 1 and 2 is a specially designed docking station 10 embodying principles of the present invention and operative to removably couple a portable computer, such as the notebook computer 12 schematically depicted in phantom in FIG. 1, to desktop computer peripheral devices (not shown) such as a keyboard, monitor, mouse and printer. Docking station 10 is designed to rest atop a horizontal support surface, such as a desk, adjacent such desktop computer peripheral devices and has a generally rectangular housing 14.

Housing 14 has front and rear vertical sides 16 and 18, left and right vertical sides 20 and 22, a bottom side 24, a front base section 26 having a top side 28 with a rectangular recess 30 therein, and a raised rear connection section 32 a forwardly facing front side 34 projecting upwardly from the top side 28 and having a horizontally elongated electrical connector 36 operatively mounted thereon.

Connector 36 is electrically coupled to appropriate interface circuitry disposed within the housing 14 and coupled to the aforementioned desktop computer peripheral devices. Projecting forwardly from the horizontally opposite ends of the connector 36 are a pair of latch hook members 38 (see FIG. 7 also), and a pair of guide pins 40 disposed beneath the latch hook members.

Figure 7:
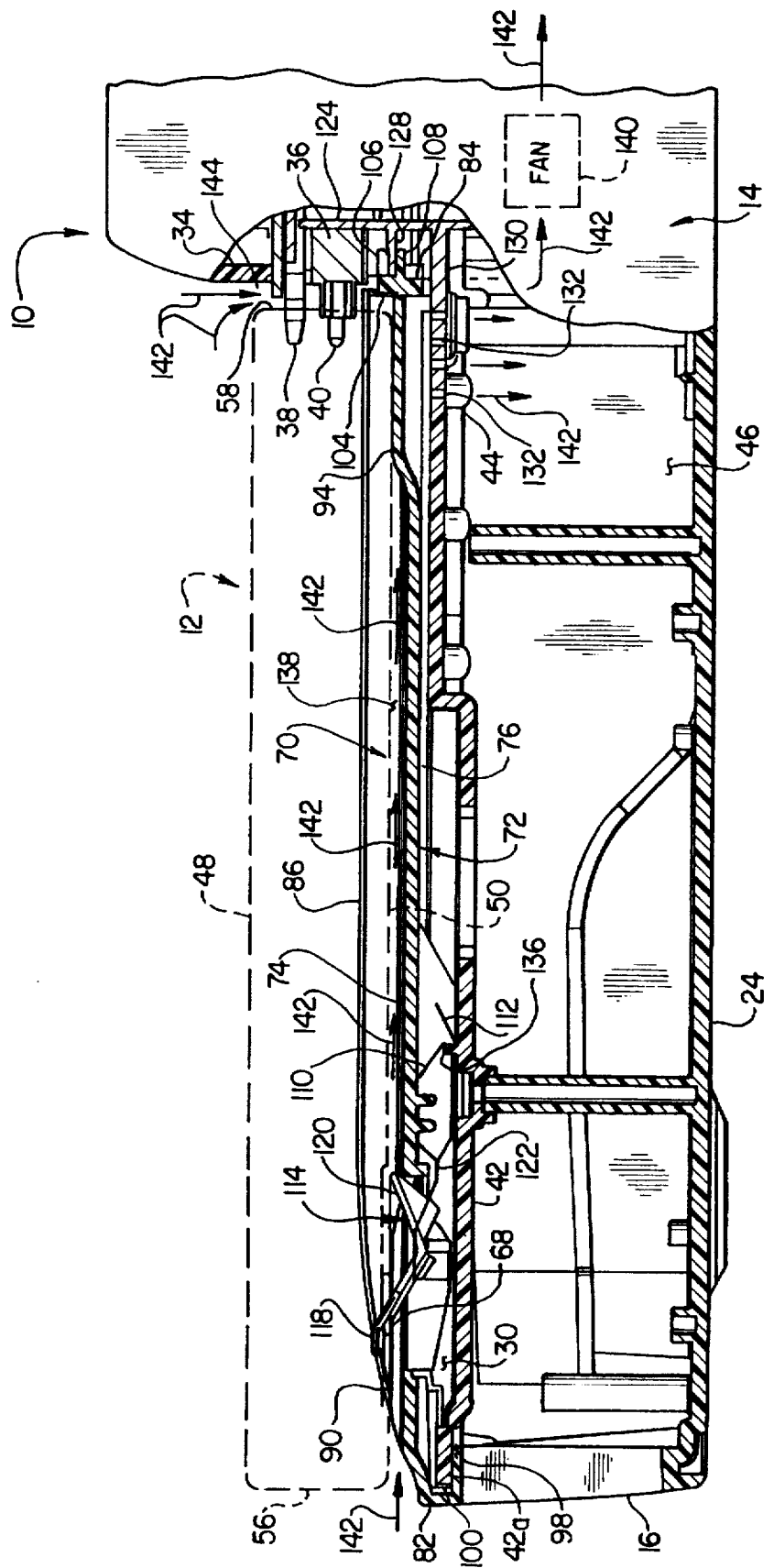
FIG. 7 is an enlarged scale, partially elevational cross-sectional view through a portion of the docking station taken generally along line 7—7 of FIG. 1.

As best illustrated in FIG. 2 and 7, the bottom side of the rectangular recess is defined by a horizontal housing wall 42 having a front side edge portion 42a. For purposed later described a small rectangular opening 44 is formed in the wall 42, along a rear side edge portion thereof beneath the connector 36, and opens into the interior 46 of the housing 14.

Figure 5:
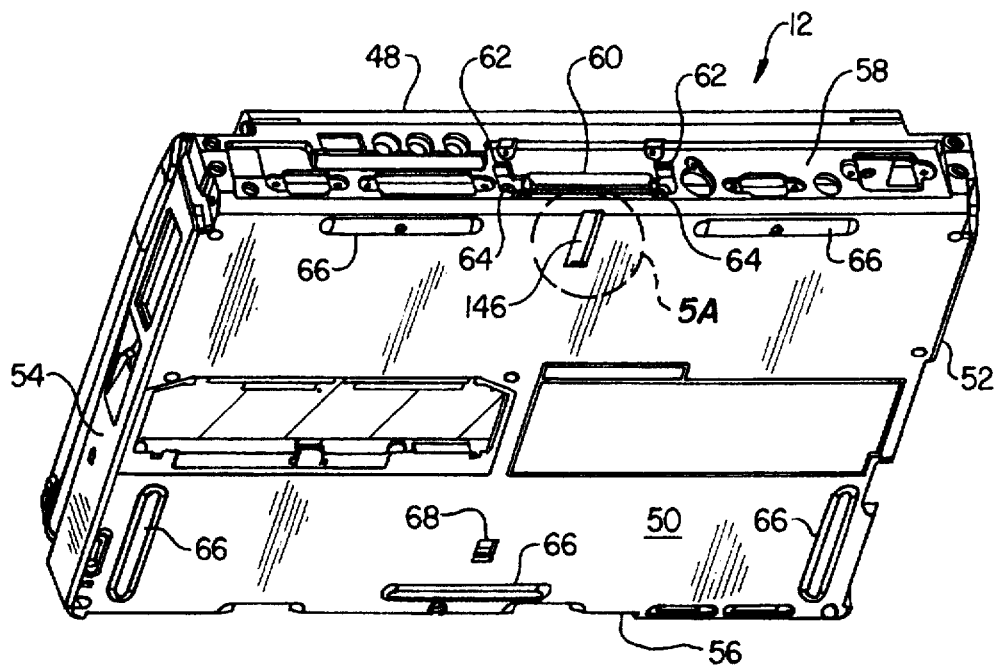
FIG. 5 is an enlarged scale bottom and rear side perspective view of the notebook computer schematically illustrated in phantom in FIG. 1.

Turning now to FIGS. 1 and 5, the notebook computer 12 has a generally rectangular configuration with top and bottom sides 48 and 50, left and right sides 52 and 54, and front and rear sides 56 and 58. As best illustrated in FIG. 5, a horizontally elongated electrical connector 60 is mounted on the rear side 58 of the computer 12 and is releasably mateable with the docking station connector 36 (see FIGS. 1 and 7) when the computer is operatively connected (i.e., "docked") to the docking station 10 as later described herein.

Positioned at opposite ends of the connector are two rectangular latch openings 62 formed in the rear computer wall 58 and configured to lockingly receive the docking station latch hook members 38 as the computer connector 60 is releasably mated with the docking station connector 36 during the docking process subsequently described herein. To facilitate a final horizontal and vertical alignment between the docking station and computer connectors 36 and 60 just prior to their interconnection during the docking process, a pair of circular openings 62 are formed in the rear computer wall 64, at opposite ends of the computer connector 60. Openings 62 are positioned to receive the docking station alignment pins 40, as the connectors 36,60 approach one another during docking, to align the connectors as they are brought into engagement with one another.

With continuing reference to FIG. 5, the bottom side 50 of the notebook computer 12 is provided with a spaced series of depending support foot projections 66. Additionally, as also shown in FIG. 7, a small rectangular security latch opening 68 is formed in the bottom side 50 of the notebook computer 12 adjacent its front side 56.

Turning now to FIGS. 1-4, according to a key aspect of the present invention the docking station 10 is useable in conjunction not only with the representatively illustrated portable computer 12, but also with another portable computer having a different physical configuration (not illustrated in FIGS. 1-4) by means of the unique incorporation in the docking station 10 of a specially designed removable shelf apparatus that includes a molded plastic shelf member 70 having a generally planar rectangular body or base wall portion 72 with top and bottom sides 74 and 76, left and right side edges 78 and 80, and front and rear side edges 82 and 84.

Projecting upwardly from the top shelf member side 74 is a guide and support portion of the overall tray apparatus that includes left and right guide ribs 86 and 88 respectively positioned inwardly adjacent the left and right tray member side edges 78 and 80 and longitudinally extending between the tray member front and rear side edges 82 and 84, and three vertical support projections 90,92,94. Support projections 90,92,94 are arranged in a noncollinear manner, with projections 90 and 92 being positioned along the front tray member edge 82 and respectively being horizontally offset toward the guide ribs 86 and 88, and projection 94 being centered along a rear side edge portion of the top side of the shelf body portion 72.

As can be seen, the three projections 90,92,94 are horizontally elongated in front to rear directions relative to the shelf body portion 72. For purposes later described, the front projections 90,92 have elongated extension portions 90a, 92a thereof that are downwardly stepped relative to the main projections 90,92 and longitudinally extend rearwardly therefrom to the rear side edge 84 of the shelf body portion 72. The top side surfaces of the three main projections 90,92,94 lie in a plane parallel to that of the top side 74 of the shelf member 72. Extending between the rear ends of these projection extensions 90a,92a, and positioned adjacent the rear shelf member side edge 84, are a series of ventilation slots 96 formed through the shelf member body portion 72.

The shelf 70 also has an attachment portion that enables the shelf to be operatively and removably attached to the top side of the docking station front support section 26. Such attachment portion includes (1) a rearwardly extending lip 98 (see FIGS. 4 and 7) disposed beneath the front side edge portion 42a of the housing 42 and defining with the front side edge portion 42a a pocket underlying it; (2) a pair of rearwardly projecting attachment tabs 102 formed on the rear ends of the guide ribs 86 and 88; (3) a vertical plate 104 projecting upwardly from the rear side edge 84 of the shelf member 72 (see FIGS. 3, 4 and 7) and having two upper tabs 106 and a lower tab 108 projecting rearwardly therefrom; and (4) an elongated resilient spring latch member 110 (see FIGS. 4 and 7) secured to the bottom side 76 of the shelf member body portion 72 and having an angled rear end portion 112.

For purposes later described herein, a central portion of an elongated security latch member 114 (see FIGS. 1-4 and 7) is pivotally secured on a front central portion of the shelf body portion 72 at an opening 116 therein. The elongated body of the latch member 114 is bent at a central portion thereof and has an angled front end 118, and a horizontally enlarged rear end 120. Latch member 114 is pivotable, about a horizontal axis parallel to the front and rear side edges 82,84 of the shelf member body portion 72, between a first position (see FIG. 3) in which the rear latch end portion 120 projects upwardly beyond the top side 74 of the shelf member body portion 72 and the front latch end portion 118 is downwardly recessed into the opening 116, and a second position (see FIG. 3A) in which the rear end portion 120 is downwardly pivoted toward the top side 74 of the body portion 72 and the front end 118 is pivoted upwardly beyond the top side 74. A spring member 122 (see FIG. 7) resiliently biases the latch member toward its FIG. 3 first position.

Referring now to FIGS. 2 and 7, positioned just behind the docking station connector 36, within the raised rear section 32 thereof, is a vertical metal support plate 124 (See FIG. 7) positioned just behind a rectangular opening 126 formed in the front side 34 of the housing portion 32. An upper horizontal tab 128 (see FIG. 7) extends forwardly from the vertical plate 124 just beneath the docking station connector 36, and a lower horizontal tab 130 (see FIGS. 2 and 7) projects forwardly from the plate 124 and extends into the opening 44 in the horizontal housing wall 42. For purposes later described, the lower horizontal tab 130 has a spaced series of ventilation openings 132 formed therein.

To operatively and removably install the shelf 70 on the docking station 10, a rear side edge portion of the shelf member body portion 72 is complementarily inserted into the top side docking station recess 30 (see FIG. 6) and the shelf member is moved rearwardly through the recess 30 until (1) the rear side shelf tabs 102 (see FIGS. 3 and 4) complementarily enter corresponding slots 134 in the housing wall 34, (2) the metal tab 128 complementarily enters the vertical space between the rear shelf tabs 106 and 108 (see FIGS. 4 and 7), (3) the front side edge portion 42a of the horizontal housing wall 42 (see FIG. 2) complementarily enters the shelf member front lip pocket 100 (see FIG. 7), and (4) the angled rear end 112 of the spring latch member 110 releasably snaps over a corresponding top side projection 136 (see FIG. 7) on the shelf body portion 72, thereby releasably locking the shelf body portion 72 in place within the top side housing recess 30.

The installed shelf body portion 72 may be easily removed from the docking station housing 14 by simply pulling the shelf member body portion rearwardly away from the housing 14, thereby causing the latch portion 112 to cam upwardly over the projection 136 to release the shelf from the housing. The complementary interengagement between front and rear side portions of the shelf member body portion 72 just described advantageously tends to maintain the body portion 72, and thus the top side surfaces of the three vertical shelf projections 90,92 and 94 in a horizontal plane to thereby compensate for molding warpage of the relatively thin body portion 72 which might otherwise deflect one or more of such projections out of the desired computer underside support plane.

With the shelf 70 removably installed on the docking station 10 in the manner described above, the notebook computer 12 (see FIGS. 3, 5, 6 and 7) is operatively coupled to the docking station 10 (and thus to the desktop computer peripheral devices associated therewith) by simply placing a rear underside portion of the computer 12 atop the front vertical shelf projections 90 and 92, positioning the left side 52 of the computer horizontally against the left shelf guide rib 86, and pushing the computer rearwardly until its rear underside portion engages and slides along the top of the rear shelf projection 94.

This sliding engagement of the computer with the removable shelf 70 provides an initial "gross" alignment between the docking station and computer connectors 36 and 60 in both horizontal and vertical directions. As the rear side 58 of the computer 12 approaches the docking station connector 36, the docking station pins 40 (see FIGS. 1 and 7) enter the openings 64 on the rear side of the computer to provide a "pin and funnel" type of final horizontal alignment between the connectors 36 and 60 to permit them to be precisely mated as the computer reaches its rearward "docked" orientation on the docking station.

While this is occurring, the docking station latch hook members 38 (see FIGS. 1 and 7) enter the rear side computer openings 62 in a manner releasably locking the forward ends of the members 38 within the interior of the computer housing and preventing the docked computer from being pulled rearwardly away from the docking station until the latch hook members 38 are pivoted toward each other (as part of an undocking mechanical sequence not pertinent to the present invention) to release the computer and permit the decoupling of the mated connectors 36 and 60.

The reduced height elongated rear portions 90a,92a of the vertical shelf projections 90 and 92 serve to prevent the underside support foot projections 66 on the computer (see FIG. 5) from dragging along the top side 74 of the shelf member body portion 72 as the computer 12 is slid rearwardly along the shelf member toward its docked orientation. More specifically, as a front underside portion of the computer 12 rearwardly passes the front vertical shelf member projections 90 and 92 it has a tendency to dip down toward the top shelf member surface 74. However, when this occurs the top sides of the projection portions 90a,92a engage the bottom side 50 of the computer and keep the support feet 66 out of engagement with the shelf surface 74. This advantageously reduces the sliding frictional force of the shelf imposed on the rearwardly moving computer, thereby facilitating its docking movement.

Figure 3:
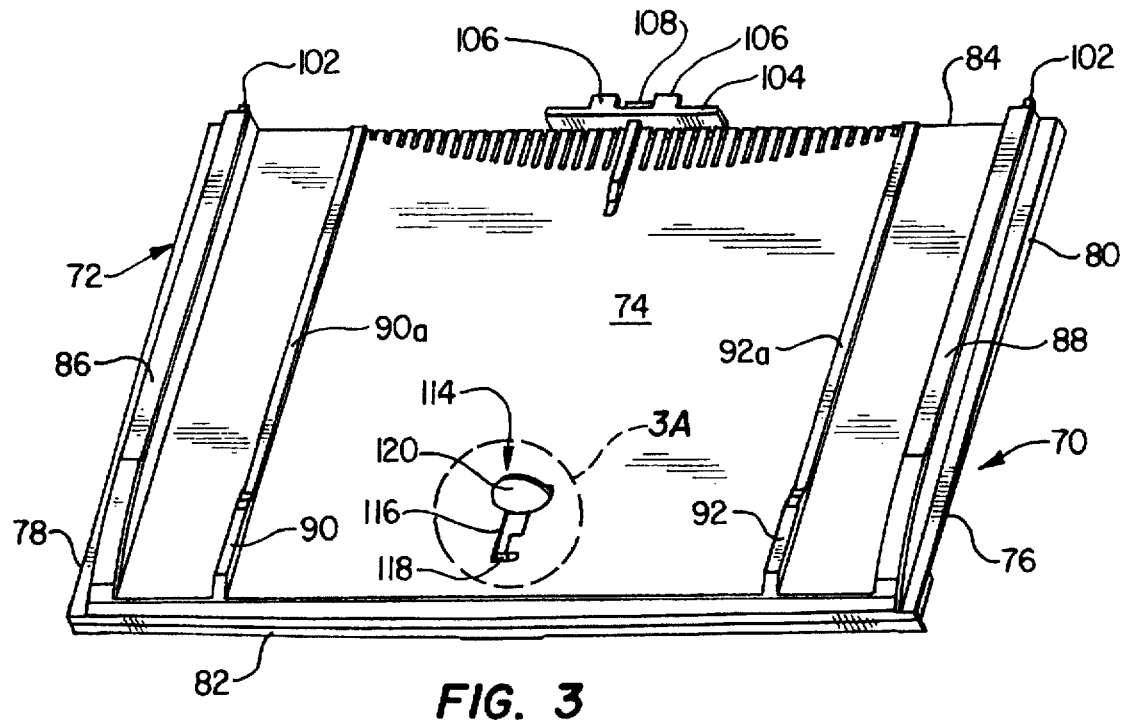
FIG. 3 is an enlarged scale top side perspective view of the shelf with a computer latch portion thereof in its normal position.
Figure 3A:
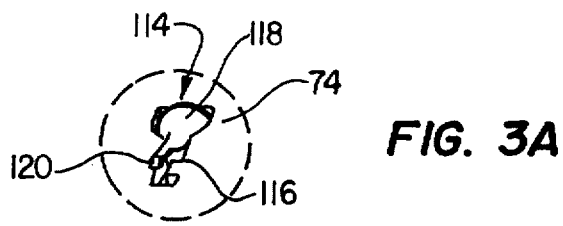
FIG. 3A is a perspective view of the circled area "3A" in FIG. 3, and illustrates the latch portion pivoted to its locking position.
Figure 4:
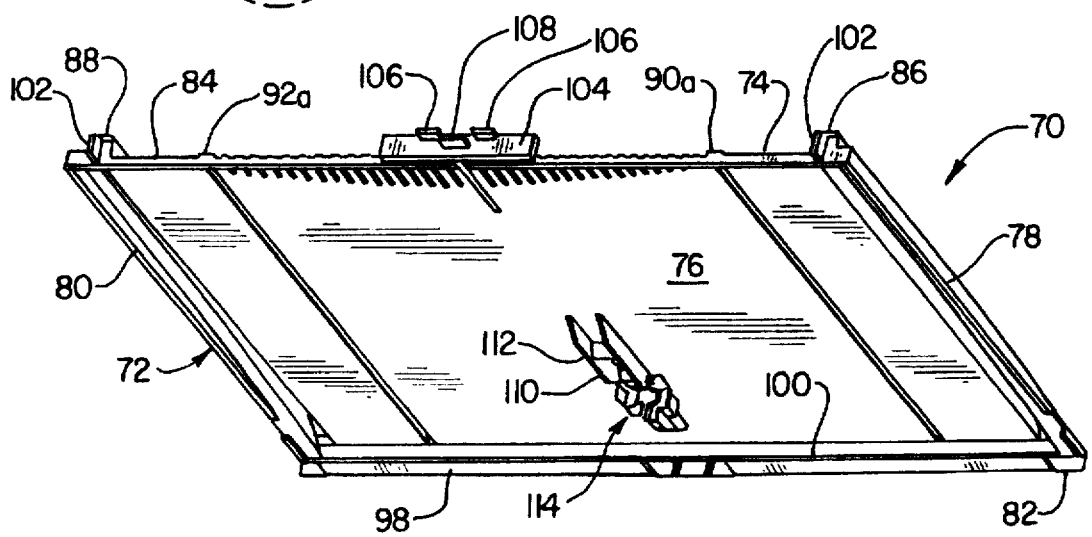
FIG. 4 is an enlarged scale bottom side perspective view of the shelf.

Turning now to FIGS. 3, 3A and 7, prior to the docking of the computer 12, the security latch member 114 is in its FIG. 3 position in which the front end 118 of the latch member 114 is recessed within the shelf opening 116, and the rear end 120 of the latch member projects upwardly beyond the top side 74 of the shelf member body portion 72.

As the front side 58 of the computer 12 moves rearwardly along the shelf member 72 it engages the rear latch member end 120 and pivots the latch member 114 toward its FIG. 3A position. Finally, as the bottom computer side opening 68 (see FIGS. 5 and 7) comes into alignment with the front latch member end 118, the end 118 upwardly enters the opening 68.

As the connectors 36,70 mate, the front end 118 of the latch member 114 is brought into an overlying relationship (as best shown in FIG. 7) with a bottom wall portion of the computer positioned just rearwardly of the computer underside opening 68. This interengagement between the front latch member end 118 and the computer 12 substantially prevents the docked computer 12 from being pivoted in a clockwise direction (as viewed in FIG. 7) to bend and break the docking station latch hook members 38 and thereby permit unauthorized removal of the computer 12 from the docking station 10.

The latch member 114 in its latching position shown in FIGS. 3A and 7, however, does not hinder the rearward removal of the computer 12 from the docking station 10 when the docking station latch hook members 38 are unlatched from the rear side of the docked computer. When this is done, and the computer 12 moved rearwardly, the latch member spring 122 (see FIG. 7) simply moves the front latch end 118 downwardly through the computer underside opening 68 as the computer 12 is rearwardly removed from the docking station 10. After such removal, the spring 122 pivotally returns the security latch member 114 to its FIG. 3 "ready" position.

Figure 6:
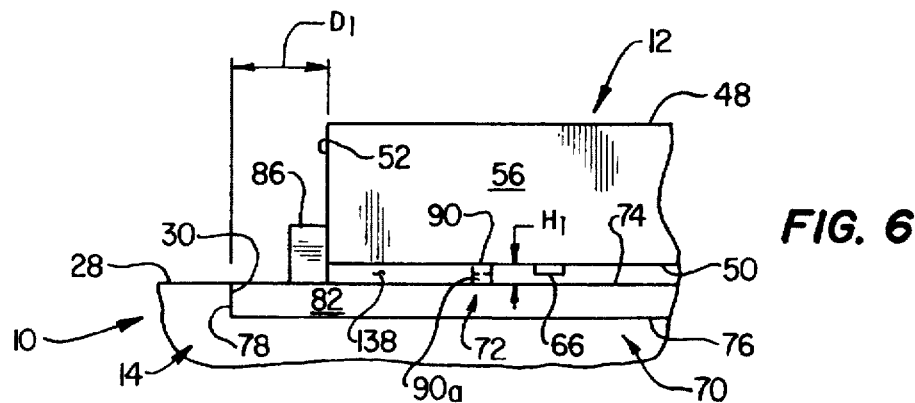
FIG. 6 is an enlarged scale, simplified schematic cross-sectional view through a portion of the docking station taken along line 6—6 of FIG. 1 and illustrating the notebook computer in docking alignment with the shelf.

With reference now to FIGS. 6 and 7, when the computer 12 is operatively coupled to the docking station 10 as described above, the bottom side of the docked computer 12 rests atop the three vertical shelf projections 90, 92 and 94, thereby creating a space 138 between the bottom side 50 of the docked computer 12 and the top side 74 of the shelf member body portion 72. This space 138 serves as a cooling air flow space for the docked computer.

More specifically, during operation of the docked computer 12, a schematically depicted fan 140 disposed within a rear portion of the docking station housing 14 operates to sequentially draw ambient cooling air 142 into the front side of the passage 138, rearwardly through the passage 138, downwardly through the ventilation openings 132 in the horizontal metal tab 130 into the interior of the docking station housing 14, through the fan 140, and then outwardly through a rear side portion of the housing 14. Fan 140 additionally flows ambient cooling air 142 downwardly through a gap 144 between the rear side 58 of the docked computer 12 and the front side 34 of the docking station rear section 32, downwardly through the metal tab openings 132, through the fan 140 and outwardly through a rear side portion of the housing 14.

The incorporation of the removable shelf 70 into the docking station 10 permits the same docking station to be used not only with the illustrated portable computer 12, but also with portable computers having different form factors. As used in this context, the term "form factor" refers to the size of the computer's housing and the placement thereon of the computer connector 36.

One example of this removable shelf-created flexibility can be illustrated with reference to FIG. 6. As will be recalled, the connector 60 of the illustrated portable computer is initially aligned with the docking station connector 36, during rearward docking movement of the computer, by simply placing the left side 52 against the left shelf guide rib 86 and sliding it along such rib. With a second portable computer having a differently sized housing, all that is necessary is to space the connector 60 of this second computer the same horizontal distance away from its left side, and the same vertical distance away from its bottom side 50, place the left side 52 of the second computer against the left shelf guide rib 86, and slide the second computer rearwardly along the vertical shelf projections 90,92,94 until the second computer is operatively coupled to the docking station 10.

Another way presented by the present invention to adapt a portable computer to the docking station 10, when the computer connector 60 (relative to its bottom housing side) is otherwise too high or too low for the docking station connector 36 is to modify the underside of the computer to change the elevation of a rear underside portion of the docked computer relative to the rear vertical shelf projection 94.

More specifically, as illustrated in FIG. 5, when the computer connector 60 is otherwise too high (relative to the bottom side 50 of the computer) for the docking station connector 36 a small depression 146 is formed in the bottom side 50 of the computer 12 adjacent the rear side 58 of the computer. The depression 146 is positioned and configured to complementarily receive a top portion of the rear vertical shelf projection 94 as the computer reaches its docked orientation to thereby effectively lower the computer connector 60 into precise vertical alignment with the connector 36 during docking of the computer.

Figure 5A:
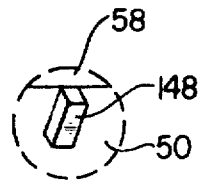
FIG. 5A is a perspective view of an alternate embodiment of a height adjustment feature shown in the circled area "5A" in FIG. 5.

Alternatively, as illustrated in FIG. 5A, if the computer connector 60 is too low (relative to the bottom computer side 50) for the docking station connector 36 the depression 146 is replaced with a downward projection 148 positioned to rest atop the rear vertical shelf projection 194 when the computer is docked, and having a vertical depth sized to raise the computer connector 60 into precise vertical alignment with the docking station connector 36 as the connector 60 is rearwardly brought into adjacency with the connector 36 during docking.

As schematically depicted in FIG. 6, the illustrated shelf 70 is specifically configured to accommodate the computer 12, the shelf member body portion 72 having a horizontal distance D1 between the left shelf member side edge 78 and the right vertical side of the guide rib 86, and a height H1 between the top side 74 of the shelf member body portion 72 and the top side plane of the vertical shelf member support projections 90,92 and 94. These two shelf dimensions are appropriately correlated with the horizontal and vertical distances of the computer connector 60 respectively from the left computer side 52 and the bottom computer side 50 to horizontally and vertically align the two connectors 36 and 60 during docking of the computer 12 when it is slid along the horizontal and vertical guide surfaces of the shelf member body portion 72 as described above.

Figure 6A:
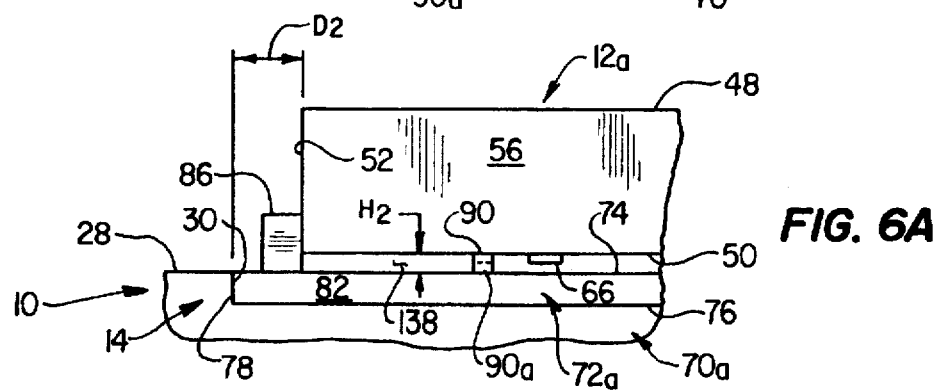
FIG. 6A is a view similar to that in FIG. 6, but with illustrating a differently configured shelf being used in place of the shelf shown in FIGS. 1 and 6.

To accommodate a second portable computer 12a (see FIG. 6A) having a different form factor than computer 12 (i.e., representatively having a different housing size and a different connector placement thereon) a second removable shelf 70a may be provided to replace the shelf 70. The body portion 72a of the second shelf 70a is substantially identical to the body portion 72 of the shelf 70, but the guide and support portion of the second shelf 70a is differently configured to accommodate the different connector location on the second computer 12a.

Representatively, on the second shelf 70a the dimension D2 is somewhat less than the corresponding dimension D1 on the shelf 70, and the dimension H2 is somewhat greater than the corresponding dimension H1 on the shelf 70. Representatively, this shelf dimensional change corresponds to a connector placement on the second computer 12a which, relative to the left computer side, is further to the right that the corresponding connector on computer 12, and, relative to the bottom computer side, is somewhat lower than the corresponding connector on computer 12. As will readily be appreciated, a variety of differently configured interchangeable shelves can be provided to accommodate a variety of portable computers having still different form factors to permit the same docking station 10 to accommodate several differently configured portable computers if desired.

The foregoing detailed description is to be clearly understood as being given by way of illustration and example only, the spirit and scope of the present invention being limited solely by the appended claims.

What is claimed is:

1. Shelf apparatus for slidably engaging a portable computer and guiding it into an operatively coupled relationship with a docking station, said shelf apparatus comprising a shelf member having:

a body portion having a top side surface;

a guide and support portion positioned on said top side surface of said body portion and being slidably engageable by the portable computer in a manner guiding it into an operatively coupled relationship with the docking station; and an attachment portion associated with said body portion and being cooperative with a portion of the docking station to removably secure said shelf member thereto to thereby permit said shelf member to be removed and replaced with a second shelf member having a differently configured guide and support portion, said guide and support portion projecting upwardly from said top side surface and being slidably engageable by the portable computer in a manner supporting the portable computer in an upwardly spaced relationship with said top side surface, said guide and support portion including first, second and third spaced apart, noncollinear vertical support projections having upper side surfaces upwardly offset from said top side surface of said shelf member body portion and lying generally in a plane, said upper side surfaces being adapted to underlie and slidingly support an underside portion of the portable computer, at least two of said first, second and third support projections being relatively staggered in mutually perpendicular directions parallel to said top side surface of said body portion.

2. The shelf apparatus of claim 1 wherein:

said guide and support portion creates between said top side surface of said body portion and the underside of the portable computer supported thereon a cooling air flow passage, and said shelf member further has a plurality of openings formed in said body portion and through which cooling air traversing said cooling air flow passage may be discharged.

3. The shelf apparatus of claim 1 wherein:

said shelf member has opposite front and rear side edge portions, and an end edge portion extending between said front and rear side edge portions, and said guide and support portion further includes a guide projection positioned on said end edge portion and having a vertically oriented surface adapted to be slidingly engaged by a corresponding vertical surface of the portable computer.

4. The shelf apparatus of claim 1 wherein:
said body portion has an edge section, and
said attachment portion includes a lip portion formed along said edge section and forming a pocket configured to removably receive a corresponding wall edge portion of the docking station.

5. The shelf apparatus of claim 4 wherein:
said side edge section is a front side edge section of said body portion, and
said lip portion depends from said front side edge section.

6. The shelf apparatus of claim 1 further comprising a second shelf member removably securable to the docking station in place of said first-mentioned shelf member, said second shelf member having a body portion and attachment portion similar to those on said first mentioned shelf member, and a guide and support portion different than that of said guide and support portion of said first-mentioned shelf member.

7. The shelf apparatus of claim 1 wherein said shelf member is of a molded plastic construction.

8. The shelf apparatus of claim 1 wherein said shelf member has:
a rear side edge portion, and
said attachment portion includes an attachment structure associated with said rear side edge portion and being releasably mateable with a corresponding portion of the docking station.

9. The shelf apparatus of claim 8 wherein said attachment structure includes a pair of tabs spaced apart along the length of said rear side edge portion, projecting rearwardly therefrom, and configured to be removably received in corresponding slot portions of the docking station.

10. The shelf apparatus of claim 9 wherein said pair of tabs project rearwardly from opposite end portions of said rear side edge portion.

11. Shelf apparatus for slidably engaging a portable computer and guiding it into an operatively coupled relationship with a docking station, said shelf apparatus comprising a shelf member having:
a body portion having a top side surface;
a guide and support portion positioned on the top side of said body portion and being slidably engageable by the portable computer in a manner guiding it into an operatively coupled relationship with the docking station; and
an attachment portion associated with said body portion and being cooperative with a portion of the docking station to removably secure said shelf member thereto to thereby permit said shelf member to be removed and replaced with a second shelf member having a differently configured guide and support portion,
said guide and support portion projecting upwardly from said top side surface and being slidably engageable by the portable computer in a manner supporting the portable computer in an upwardly spaced relationship with said top side surface, said guide and support portion including first, second and third spaced apart, noncollinear vertical support projections having upper side surfaces upwardly offset from said top side surface of said shelf member body portion and lying generally in a plane, said upper side surfaces being adapted to underlie and slidingly support an underside portion of the portable computer,
said body portion having opposite front and rear side edge portions,
said first and second vertical support projections being positioned forwardly of said third vertical support projection, and
said guide and support portion further including fourth and fifth elongated vertical support projections longitudinally extending rearwardly from adjacent said first and second vertical support projections, respectively, and having upper side surfaces upwardly offset from said top side surface of said body portion and downwardly offset from said upper side surfaces of said first and second vertical support projections.

12. Shelf apparatus for slidably engaging a portable computer and guiding it into an operatively coupled relationship with a docking station, said shelf apparatus comprising a shelf member having:
a body portion having a top side surface;
a guide and support portion positioned on the top side of said body portion and being slidably engageable by the portable computer in a manner guiding it into an operatively coupled relationship with the docking station; and
an attachment portion associated with said body portion and being cooperative with a portion of the docking station to removably secure said shelf member thereto to thereby permit said shelf member to be removed and replaced with a second shelf member having a differently configured guide and support portion,
said shelf member having a rear side edge portion, and said attachment portion including an attachment structure associated with said rear side edge portion and being releasably mateable with a corresponding portion of the docking station,
said attachment structure including upper and lower tabs projecting rearwardly from a longitudinally intermediate section of said rear side edge portion and configured to removably receive therebetween a corresponding tab portion of the docking station.

13. Shelf apparatus for slidably engaging a portable computer and guiding it into an operatively coupled relationship with a docking station, said shelf apparatus comprising a shelf member having:
a body portion having a top side surface;
a guide and support portion positioned on the top side of said body portion and being slidably engageable by the portable computer in a manner guiding it into an operatively coupled relationship with the docking station; and
an attachment portion associated with said body portion and being cooperative with a portion of the docking station to removably secure said shelf member thereto to thereby permit said shelf member to be removed and replaced with a second shelf member having a differently configured guide and support portion,
the portable computer being respectively movable in opposite first and second horizontal directions along said guide and support portion into coupled and decoupled relationships with the docking station, and
said shelf apparatus further comprising a security latch structure carried on said body portion and being operative to releasably engage the portable computer, in response to movement thereof to its coupled relationship with the docking station, in a manner substantially preventing pivotal movement of the portable computer about a horizontal axis transverse to said first and second horizontal directions, but permitting movement of the portable computer in said second horizontal direction relative to the docking station.

14. The shelf apparatus of claim 13 wherein:

said body portion has opposite front and rear side edge portions generally transverse to said first and second horizontal directions, and said security latch structure includes:
- a latch member having opposite first and second end portions spaced apart in a direction parallel to said first and second horizontal directions and being supported on said body portion, with said first end portion facing said rear side edge portion of said body portion, for pivotal movement about a horizontal axis transverse to said first and second horizontal directions between a first position in which said first end portion is positioned above said top side of said body portion, and a second position in which said second end portion is positioned above said top side of said body portion, and
- a spring structure resiliently biasing said latch member toward said first position thereof.

15. Computer apparatus comprising:

a docking station having a connection section carrying a connector removably mateable with a corresponding connector on a portable computer, and a base section; and a shelf structure including:
- a body portion having a top side surface,
- a guide and support portion positioned on the top side of said body portion and being slidably engageable by the portable computer in a manner guiding its connector into an operatively mated relationship with said docking station connector, and
- cooperatively engageable first and second attachment portions, respectively associated with said shelf structure body portion and said docking station base section, for removably securing said shelf structure to said base section to thereby permit said shelf structure to be removed and replaced with second shelf structure having a differently configured guide and support portion, said guide and support portion projecting upwardly from said top side surface and being slidably engageable by the portable computer in a manner supporting the portable computer in an upwardly spaced relationship with said top side surface, said guide and support portion including first, second and third spaced apart, noncollinear vertical support projections having upper side surfaces upwardly offset from said top side surface of said shelf member body portion and lying generally in a plane, said upper side surfaces being adapted to underlie and slidingly support an underside portion of the portable computer.

16. The computer apparatus of claim 15 wherein:

said body portion has opposite front and rear side edge portions, said first and second vertical support projections are positioned forwardly of said third vertical support projection, and said guide and support portion further includes fourth and fifth elongated vertical support projections longitudinally extending rearwardly from adjacent said first and second vertical support projections, respectively, and having upper side surfaces upwardly offset from said top side surface of said body portion and downwardly offset from said upper side surfaces of said first and second vertical support projections.

17. The computer apparatus of claim 15 wherein:

said shelf member has opposite front and rear side edge portions, and an end edge portion extending between said front and rear side edge portions, and said guide and support portion further includes a guide projection positioned on said end edge portion and having a vertically oriented surface adapted to be slidingly engaged by a corresponding vertical surface of the portable computer.

18. The computer apparatus of claim 15 further comprising a second shelf member removably securable to the docking station in place of said first-mentioned shelf member, said second shelf member having a body portion and a first attachment portion similar to those on said first mentioned shelf member, and a guide and support portion different than that of said guide and support portion of said first-mentioned shelf member.

19. The computer apparatus of claim 15 wherein said shelf member is of a molded plastic construction.

20. The computer apparatus of claim 15 wherein said shelf member has:

a rear side edge portion, and said first attachment portion is associated with said rear side edge portion and releasably mateable with a corresponding portion of the docking station.

21. The computer apparatus of claim 15 further comprising:

a portable computer having a rear side connector and being slidably movably along said guide and support portion of said shelf member into an operatively coupled relationship with said docking station in which said computer connector is releasably mated with said docking station connector.

22. The computer apparatus of claim 21 wherein:

said guide and support portion includes a vertical projection formed on said top side surface of said body portion, and said portable computer has a rear side, and an underside projection disposed adjacent said rear side and positioned to be supported atop said vertical projection when said portable computer is operatively coupled to said docking station.

23. Computer apparatus comprising:

a docking station having a connection section carrying a connector removably mateable with a corresponding connector on a portable computer, and a base section; and a shelf structure including:
- a body portion having a top side surface,
- a guide and support portion positioned on the top side of said body portion and being slidably engageable by the portable computer in a manner guiding its connector into an operatively mated relationship with said docking station connector, and
- cooperatively engageable first and second attachment portions, respectively associated with said shelf structure body portion and said docking station base section, for removably securing said shelf structure to said base section to thereby permit said shelf structure to be removed and replaced with a second shelf structure having a differently configured guide and support portion, said guide and support portion creating between said top side surface of said body portion and the underside of the portable computer supported thereon a cooling air flow passage, said shelf member further having a plurality of openings formed in said body portion and through which cooling air traversing said cooling air flow passage may be discharged, and said computer apparatus further comprising cooling means for flowing cooling air through said cooling air flow passage.

24. The computer apparatus of claim 23 wherein said cooling means include:

a fan disposed in said docking station and having an inlet and an outlet, and opening means formed in said docking station and through which said fan inlet and said cooling air flow passage communicate.

25. Computer apparatus comprising:

a docking station having a connection section carrying a connector removably mateable with a corresponding connector on a portable computer, and a base section; and a shelf structure including:
 a body portion having a top side surface,
 a guide and support portion positioned on the top side of said body portion and being slidably engageable by the portable computer in a manner guiding its connector into an operatively mated relationship with said docking station connector, and
 cooperatively engageable first and second attachment portions, respectively associated with said shelf structure body portion and said docking station base section, for removably securing said shelf structure to said base section to thereby permit said shelf structure to be removed and replaced with a second shelf structure having a differently configured guide and support portion, said second attachment portion including a wall edge portions of said docking station, said body portion having an edge section, and said first attachment portion including a lip portion formed along said body portion edge section and forming a pocket configured to removably receive said docking station wall edge portion.

26. The computer apparatus of claim 25 wherein:

said edge section is a front side edge section of said body portion, and said lip portion depends from said front side edge section of said body portion.

27. Computer apparatus comprising:

a docking station having a connection section carrying a connector removably mateable with a corresponding connector on a portable computer, and a base section; and a shelf structure including:
 a body portion having a top side surface,
 a guide and support portion positioned on the top side of said body portion and being slidably engageable by the portable computer in a manner guiding its connector into an operatively mated relationship with said docking station connector, and
 cooperatively engageable first and second attachment portions, respectively associated with said shelf structure body portion and said docking station base section, for removably securing said shelf structure to said base section to thereby permit said shelf structure to be removed and replaced with a second shelf structure having a differently configured guide and support portion, said shelf member having a rear side edge portion, and said first attachment portion being associated with said rear side edge portion and releasably mateable with a corresponding portion of the docking station, said docking station having a plurality of slots formed therein, and said connection portion including a pair of tabs spaced apart along the length of said rear side edge portion, projecting rearwardly therefrom, and configured to be removably received in said plurality of slots.

28. The computer apparatus of claim 27 wherein said pair of tabs project rearwardly from opposite end portions of said rear side edge portion.

29. Computer apparatus comprising:

a docking station having a connection section carrying a connector removably mateable with a corresponding connector on a portable computer, and a base section; and a shelf structure including:
 a body portion having a top side surface,
 a guide and support portion positioned on the top side of said body portion and being slidably engageable by the portable computer in a manner guiding its connector into an operatively mated relationship with said docking station connector, and
 cooperatively engageable first and second attachment portions, respectively associated with said shelf structure body portion and said docking station base section, for removably securing said shelf structure to said base section to thereby permit said shelf structure to be removed and replaced with a second shelf structure having a differently configured guide and support portion, said shelf member having a rear side edge portion, and said first attachment portion being associated with said rear side edge portion and releasably mateable with a corresponding portion of the docking station, said first attachment portion including upper and lower tabs projecting rearwardly from a longitudinally intermediate section of said rear side edge portion, and said second attachment section including a forwardly projecting tab disposed on said docking station and configured and positioned to be closely received between said upper and lower tabs.

30. Computer apparatus comprising:

a docking station having a connection section carrying a connector removably mateable with a corresponding connector on a portable computer, and a base section; and a shelf structure including:
 a body portion having a top side surface,
 a guide and support portion positioned on the top side of said body portion and being slidably engageable by the portable computer in a manner guiding its connector into an operatively mated relationship with said docking station connector, and
 cooperatively engageable first and second attachment portions, respectively associated with said shelf structure body portion and said docking station base section, for removably securing said shelf structure to said base section to thereby permit said shelf structure to be removed and replaced with a second shelf structure having a differently configured guide and support portion, said body portion having a bottom side, and said first attachment portion including a latch structure carried on said bottom side and being operative to engage a corresponding portion of said docking station and releasably hold said body portion on said docking station.

31. Computer apparatus comprising:

a docking station having a connection section carrying a connector removably mateable with a corresponding connector on a portable computer, and a base section; and a shelf structure including:

a body portion having a top side surface, a guide and support portion positioned on the top side of said body portion and being slidably engageable by the portable computer in a manner guiding its connector into an operatively mated relationship with said docking station connector, and cooperatively engageable first and second attachment portions, respectively associated with said shelf structure body portion and said docking station base section, for removably securing said shelf structure to said base section to thereby permit said shelf structure to be removed and replaced with a second shelf structure having a differently configured guide and support portion, the portable computer being respectively movable in opposite first and second horizontal directions along said guide and support portion into coupled and decoupled relationships with the docking station, and said shelf structure further comprising a security latch structure carried on said body portion and being operative to releasably engage the portable computer, in response to movement thereof to its coupled relationship with the docking station, in a manner substantially preventing pivotal movement of the portable computer about a horizontal axis transverse to said first and second horizontal directions, but permitting movement of the portable computer in said second horizontal direction relative to the docking station.

32. The computer apparatus of claim 31 wherein:

said body portion has opposite front and rear side edge portions generally transverse to said first and second horizontal directions, and said security latch structure includes:

a latch member having opposite first and second end portions spaced apart in a direction parallel to said first and second horizontal directions and being supported on said body portion, with said first end portion facing said rear side edge portion of said body portion, for pivotal movement about a horizontal axis transverse to said first and second horizontal directions between a first position in which said first end portion is positioned above said top side of said body portion, and a second position in which said second end portion is positioned above said top side of said body portion, and a spring structure resiliently biasing said latch member toward said first position thereof.

33. Computer apparatus comprising:

a docking station having a connection section carrying a connector removably mateable with a corresponding connector on a portable computer, and a base section;

a shelf structure including:

a body portion having a top side surface, a guide and support portion positioned on the top side of said body portion and being slidably engageable by the portable computer in a manner guiding its connector into an operatively mated relationship with said docking station connector, and cooperatively engageable first and second attachment portions, respectively associated with said shelf structure body portion and said docking station base section, for removably securing said shelf structure to said base section to thereby permit said shelf structure to be removed and replaced with a second shelf structure having a differently configured guide and support portion; and a portable computer having a rear side connector and being slidably movably along said guide and support portion of said shelf member into an operatively coupled relationship with said docking station in which said computer connector is releasably mated with said docking station connector, said guide and support portion including a vertical projection formed on said top side surface of said body portion, and said portable computer having a rear side, and an underside recess positioned adjacent said rear side and configured to complementarily receive an upper portion of said vertical projection when said portable computer is operatively coupled to said docking station.

34. A docking station for operatively linking a portable computer to a computer peripheral device, comprising:

a top side surface section;

a spaced plurality of projections extending upwardly from said top side surface section and operative to underlie and support the portable computer when it is operatively docked with said docking station, the underside of the docked portable computer forming with said top side surface section a passage; and cooling means for flowing cooling air through said passage to dissipate operating heat from the docked portable computer.

35. The docking station of claim 34 wherein said cooling means include:

a cooling fan disposed within said docking station and having an inlet, and opening means formed in said docking station and communicating said passage with said cooling fan inlet.

36. A docking station for operatively linking a portable computer to a computer peripheral device, comprising:

a side surface section;

a spaced plurality of projections extending outwardly from said side surface section and operative to engage a side portion of the portable computer when it is operatively docked with said docking station, the engaged side surface of the docked portable computer forming with said side surface section a passage; and cooling means for flowing cooling air through said passage to dissipate operating heat from the docked portable computer.

37. The docking station of claim 36 wherein said cooling means include:

a cooling fan disposed within said docking station and having an inlet, and opening means formed in said docking station and communicating said passage with said cooling fan inlet.

* * * * *